United States Patent
Hagg

(10) Patent No.: US 8,239,899 B2
(45) Date of Patent: Aug. 7, 2012

(54) METHOD FOR REPRODUCING DATA STREAMS

(75) Inventor: Wilhelm Hagg, Weinstadt (DE)

(73) Assignee: Sony Deutschland GmbH, Cologne (DE)

( * ) Notice: Subject to any disclaimer, the term of this patent is extended or adjusted under 35 U.S.C. 154(b) by 2309 days.

(21) Appl. No.: 10/219,519

(22) Filed: Aug. 15, 2002

(65) Prior Publication Data

US 2003/0035072 A1    Feb. 20, 2003

(30) Foreign Application Priority Data

Aug. 17, 2001  (EP) .................................. 01119938

(51) Int. Cl.
*H04N 7/173* (2011.01)
*H04N 7/10* (2006.01)
*H04N 5/445* (2011.01)
*G06F 17/00* (2006.01)

(52) U.S. Cl. ............... 725/89; 725/134; 386/350

(58) Field of Classification Search ............ 725/28, 725/148, 32, 89, 134, 142; 704/51; 386/343, 386/345, 350
See application file for complete search history.

(56) References Cited

U.S. PATENT DOCUMENTS

| | | | |
|---|---|---|---|
| 5,345,430 A | 9/1994 | Moe | |
| 5,633,837 A | 5/1997 | Gantt | |
| 5,754,783 A * | 5/1998 | Mendelson et al. | 709/217 |
| 5,818,441 A * | 10/1998 | Throckmorton et al. | 715/717 |
| 5,825,430 A * | 10/1998 | Adolph et al. | 348/487 |
| 5,926,205 A * | 7/1999 | Krause et al. | 725/103 |
| 6,088,455 A | 7/2000 | Logan et al. | |
| 6,122,660 A * | 9/2000 | Baransky et al. | 709/217 |
| 6,177,930 B1 * | 1/2001 | Chernock et al. | 715/716 |
| 6,357,045 B1 * | 3/2002 | Devaney | 725/138 |
| 6,473,903 B2 * | 10/2002 | Balakrishnan et al. | 725/135 |
| 7,039,933 B1 * | 5/2006 | Chen et al. | 725/36 |
| 2002/0174438 A1 * | 11/2002 | Cleary et al. | 725/100 |
| 2003/0133043 A1 * | 7/2003 | Carr | 348/563 |
| 2007/0081794 A1 * | 4/2007 | Baynger et al. | 386/112 |

FOREIGN PATENT DOCUMENTS

| | | |
|---|---|---|
| EP | 1 037 419 | 9/2000 |
| WO | WO 97 43838 | 11/1997 |
| WO | WO 99 37045 | 7/1999 |

* cited by examiner

*Primary Examiner* — Pankaj Kumar
*Assistant Examiner* — Reuben M Brown
(74) *Attorney, Agent, or Firm* — Oblon, Spivak, McClelland, Maier & Neustadt, L.L.P.

(57) ABSTRACT

Method for reproducing data streams, in particular of broadcast data, comprising the steps of: receiving at least one receiving data stream (RDS); providing a reproducing data stream (PDS) on the basis of said receiving data stream (RDS) and/or of derivatives (D-RDS) thereof; reproducing said reproducing data stream (PDS); including into said reproducing data stream (PDS) and thereby reproducing at least parts (S2,1-S2,6) of a second data stream (DS2) and/or of derivatives (D-DS2) thereof instead of said receiving data stream (RDS) in response to a first control signal; and generating said derivatives (D-RDS) of at least parts (S1,1-S1,7) of said receiving data stream (RDS).

26 Claims, 4 Drawing Sheets

METHOD FOR REPRODUCING DATA STREAMS

The present invention relates to a method for reproducing data streams, in particular of broadcast data. In addition, the present invention relates to a device for reproducing data streams.

In general, the reproducing of data streams may be related to various kinds of data, e.g. to audio data or video data in conjunction with a corresponding radio system or TV-system, respectively. By way of example, said audio data or video data may be live data streams and/or broadcast data streams, which are received by the corresponding system such as to be reproduced for a consumer. For the following explanation, reference is made to a radio system without any limitation thereto.

With current radio systems, a listener is passive and has no opportunity to influence the program besides changing the station. Further, current radio systems are non-interactive such that the listener is usually bound to the program he is actually listening to.

Even if the station is dedicated to a special user group and plays only songs from selected music categories, there might be a user requirement to escape from songs or reports. As an example, some people temporarily do not like to hear news, but they do not want to escape from the hourly news service in general.

The growing amount of traffic announcements is a problem for radio stations. On the one hand, a radio station wants to provide their listeners on the road the best traffic service, on the other hand, the listeners at home and those listeners with navigation systems providing dynamic routing are not interested at all in those announcements and feel disturbed by long traffic sessions. Finally, listeners might be interested only in those messages which are near the own location and not in all messages within the coverage area of the radio station.

Up to now there is no way to escape the advertising spots on radio stations, even if people are willing to pay for that. Additional advertising free stations with a subscription fee are no solution for that, since people usually like to listen to their preferred radio station.

It is an object underlying the present invention to provide a method and a device for reproducing data streams, by which a flexible reproducing of a reproducing data stream is achieved without missing information from a receiving data stream.

This object is solved by a method for reproducing data streams as described herein, as well as a device as described herein. Preferred embodiments of said method are defined herein.

The method according to the present invention for reproducing data streams, in particular of broadcast data, comprises the steps of receiving at least one receiving data stream, providing a reproducing data stream on the basis of said receiving data stream and/or of derivatives thereof, reproducing said reproducing data stream, including into said reproducing data stream and thereby reproducing at least parts of a second data stream and/or of derivatives thereof instead of said receiving data stream in response to a first control signal, and generating said derivatives of at least parts of said receiving data stream.

Preferably, said derivatives of parts of said receiving data stream are reproduced with said reproducing data stream instead of said second data stream in response to a second control signal.

Preferably, said method according to the present invention may be applicable to a radio system, wherein said receiving data stream corresponds to a radio program, without the invention being limited to this example. In the case of a radio system, a main advantage of the present invention is that a user of said radio system has a limited control capability by e.g. skipping a current song or report by means of generating said first control signal without losing the synchronization of a selected radio station. Furthermore, the system allows a very efficient and flexible way for the announcement of traffic events: traffic-related announcement may be filtered according to the requirements of the user. Finally, said method enables new business models for radio stations by providing different levels of advertising. However, said method may also be applied for television broadcast, e.g. music channels on TV. It is in general suitable for all live broadcast transmissions where the corresponding data stream consists of single segments with a limited length of a few minutes. Accordingly, it is preferable if live data streams and/or broadcast data streams are used as said receiving data stream.

Preferably, segmentation data and/or category data at least for said receiving data stream are provided, and at least parts and/or segments of said receiving data stream as parts and/or segments of said reproducing data stream are selected in accordance to said segmentation data and/or to said category data.

With reference to the above example of said radio system, a basic idea of the invention is to make use of natural segmentation of a radio audio stream. Such a stream is given by a sequential arrangement of songs, reports, traffic announcements, use and advertising spots. Some of these segments are picked from an audio database as songs and spots, others are spoken live by the moderator of the program. The knowledge of the segmentation structure in conjunction with a storage buffer at the receiver enables the rearrangement of this audio segments. Especially in combination with the second data stream, e.g. from a secondary audio source or an instant memory means, as well as context information for each segment, the user has the opportunity to react in a flexible way while listening e.g. to his preferred radio station.

For this example, in particular it is possible to skip the rest of a segment and continue at the beginning of a next segment, e.g. a song or a report, to skip back to the beginning of the current segment which is currently reproduced, further to permanently store a segment during playback on request, and to filter segments by different criteria. The latter one is especially interesting for traffic announcements and advertising spots, while skipping and permanent storage are of general interest. Furthermore, in addition to skip functions, also a rewind and forward function may be applied to a part and/or segment of said second data stream included into said reproducing data stream. Thus, a user may e.g. listen again to a favourite song or parts thereof contained within said second data stream by rewinding. Alternatively, the user may e.g. avoid listening to a part of a song he does not actually like by using the forward function. In this way, the user may have an individual control of the reproduction of said second data stream included into said reproducing data stream.

Preferably, said generating of a respective derivative corresponds to a storing, a recording and/or a buffering thereof which may be realized in conjunction with a temporal buffer means and/or a permanent storage means such as an audio cassette.

One essential feature of said method is that e.g. the radio program, which corresponds e.g. to said receiving data stream, is not interrupted by filtering and skipping besides the skip itself. By way of example, using temporary storage means for audio buffering allows to rearrange at least parts and/or segments in such a way that the listener will not recognize that the program is manipulated by said method. The program is still a live program.

Besides radio broadcast, the proposed system may also apply for television broadcast, e.g. music channels on TV, or further to a radio program and/or a TV program transmitted via the internet. It is in general suitable for all live transmissions where the corresponding stream consists of single segments with a limited length of a few minutes.

Preferably, a part and/or a segment of said reproducing data stream is recorded upon request of the user while reproducing said respective part and/or segment.

Still further preferably, parts and/or segments of said second data stream are selected from an instant data stream, in particular from an instant memory means. In this preferred embodiment, specific parts and/or segments of said reproducing data streams may be stored in said instant memory means upon request of the user such that these specific parts and/or segments form said second data stream which may be included into said reproducing data stream and thereby reproduced in response to the first control signal. Alternatively, the user has the possibility to store e.g. specific songs as said second data stream in said instant memory means, such that these songs may be included into said reproducing data stream. In this case, it may be possible for the user to choose these songs by scrolling a list thereof.

Preferably, said segmentation data and/or said category data are generated from and/or received with said receiving data stream. As for example, a segmentation structure of the receiving data stream may be provided directly by a radio station. Since in this case the segmentation information is directly available at the station and will therefore exactly match the broadcast data stream, this option provides a high accuracy. Alternatively, an external Independent server may be provided, which contains a signal processor for the extraction of the segmentation information. As for example, a central server serving a plurality of receiver clients will lead to a high degree of efficiency of computational resources to obtain a better segmentation.

Still preferably, reproduction control data may be provided for controlling the selection and/or reproduction of said reproducing data stream. In this embodiment, said first control signal may be generated from and/or in accordance to said reproduction control data. As for example, said reproduction control data may be related to a default by which the user defines his favourite type of data stream segment. It is possible that the user defines said default such that any segment included in the receiving data stream except of traffic announcements is reproduced as said reproducing data stream, wherein during the time period in which the receiving data stream contains a segment of traffic announcement said second data stream, i.e. a favourite song of the user, is included into said reproducing data stream and thereby reproduced. Thus, upon recognizing that a segment of a type is included in said receiving data stream which the user is not interested in, in accordance with said reproduction control data, said first control signal is generated.

Further, said first control signal may be generated upon request. In this case, it is possible for the user e.g. to press a button provided with the radio system, such that the user can spontaneously decide not to listen to an actual part and/or segment of said receiving data stream which is reproduced as said reproducing data stream. By pressing the button, said first control signal is generated such that a part of the second data stream, e.g. a favourite song of the user, is included into said reproducing data stream and thereby reproduced. However, during the reproducing of said favourite song derivatives of at least parts of said receiving data stream are generated such that no information which may be of interest for the user is missed lateron.

Further preferably, said at least parts of said second data stream and/or of derivatives thereof are selected from a list. As for result, the user may chose e.g. one of his favourite songs which is contained in said second data stream from a list which may be displayed by means of a display means, such that said favourite song is included into said reproducing-data stream and thereby reproduced.

Still further preferably, said second control signal may be generated at the termination of reproducing one part and/or segment of said second data stream and/or a reproduction of said second data stream with said reproducing data stream. In case that the user has skipped the reproducing of a specific part included in said receiving data stream in order to listen to e.g. a favourite song which is part of the second data stream, upon termination of said favourite song said method returns to reproducing said receiving data streams or a derivative thereof.

Preferably, a derivative of at least a part of said receiving data stream is reproduced as said reproducing data stream with a higher or lower speed than a regular reproduction speed until said derivative of said receiving data stream is essentially temporal coincident with said receiving data stream. With respect to the example given in the paragraph above, it is to be understood that whilst reproducing said favourite song, the live program of a radio station corresponding to the receiving data stream is going on. As for result, upon termination of said favourite song, said method may not directly return to reproduce said receiving data stream corresponding to the live program, but rather returns to a segment of said receiving data stream which is stored by means of said derivative of said receiving data stream, such that the user will not recognize that the program has been manipulated. In order to "catch up" said live program, it is possible to reproduce said derivative of said receiving data stream or at least parts thereof with a speed being slightly higher than a regular reproduction speed such that an audio distortion is not noticed by the user. Said derivative of said receiving data stream is reproduced with said higher speed until it is essentially temporal coincident with said receiving data stream such that the retention has been caught up. Alternatively, it may also be possible to reproduce said derivative of said receiving data stream or at least parts thereof with a speed slightly lower than a regular reproduction speed until said derivative is also coincident with said receiving data stream. Thus, a reproduction of said derivative of said receiving data stream either with a higher speed or a lower speed may both result in that said live program can be "caught up".

Preferably, categories of segments of said reproducing data stream and/or of said second data stream, are evaluated according to different priority levels. In addition, upon receipt of a segment of said receiving data stream and/or of said second data stream which belongs to a certain category, said segment or a derivative thereof is unconditionally included into said reproducing data stream for immediate and essentially instantaneous reproduction.

Further preferably, according to this embodiment said certain category of said segment which is included into said reproducing data stream for immediate and essentially instantaneous reproduction is of a higher priority than a category of a part and/or segment of said reproducing data stream or derivative thereof, or than a category of a part and/or segment of said second data stream or derivatives thereof, being reproduced whilst receiving said segment belonging to said certain category.

Further preferably, said receipt of said segment of said receiving data stream is dependent on a temporal attribute of a device adapted to perform said method. By way of example, said device is a radio system installed within a car, wherein said temporal attribute corresponds to the actual geographic coordinates of said car, i.e. the receipt of said segment of said receiving data stream is dependent on whether the car is actually located near to the reported event.

A main advantage of this embodiment relates to e.g. handling traffic messages transmitted together with a radio program. In general, traffic messages may be divided in first performance-related messages which are purely related to travel time, and second to warning messages which are used to inform a driver about potentially dangerous events and therefore directly addresses the security of the driver. By way of example, according to a predetermined default of said reproduction control data, no performance-related messages which are included in said receiving data stream are reproduced in said reproducing data stream because the driver is not interested in this kind of message. Instead, each time said kind of segment included in said receiving data stream occurs, e.g. a favourite song of the driver, as part of said second data stream, may be included in said reproducing data stream and thereby may be reproduced. However, a warning message has a higher priority than e.g. said favourite song of the driver. As for result, upon occurence of said warning message included in said receiving data stream, the reproduction of said favourite song is immediately interrupted such that said warning message, or a derivative thereof, is included into said reproducing data stream for immediate and instantaneous reproduction.

In a further development of said embodiment said warning messages could be filtered out based on the current location of the radio system which may be provided by a navigation system. As for result, the driver will only listen to security-related traffic messages which are related to events near to his current position. Still further, it is possible to adapt the radio system to this option. By way of example, a radio system which is installed in a car may present said traffic messages in general, while a radio system connected with a home receiver may not. Still further, this default setting may be overwritten by the user, e.g. by operating an ON/OFF-button for traffic announcements provided with the radio system.

Still further preferably, said reproducing data stream is generated and/or reproduced such that distinct parts or segments stemming from live data streams and/or broadcast data streams are reproduced with a minimum time delay essentially in temporal coincidence with the respect part or segment of said receiving data stream.

Preferably, said reproducing data stream is built up for a continuous and/or unbroken reproduction of said receiving data stream or of derivatives thereof. In addition, or alternatively, said reproducing data stream is built up for a continuous and/or unbroken reproduction of said second data stream or of derivatives thereof. This may be achieved by essentially sequentially concatenating selected parts or segments or derivatives thereof with fitting beginnings and ends, in particular in a smooth way. As for result, the user will generally not recognize that there is a background channel, wherein the user is neither becoming aware that the live radio program is manipulated by said method.

Preferably, said recording data stream may be based on analog and/or digital signals. For example, in case that said receiving data stream is based on analog signals, the so-called RDS (Radio Data System)-signals which are commonly known from FM-systems may be used for providing the segmentation information at least for said receiving data stream.

Alternatively, in case that said recording data stream is based on digital signals, the segmentation information for said receiving data stream may be provided by the so-called PAD (Program Associated Data). Alternatively, this purpose may be also achieved by an IP connection using the internet or any other network connection which might be available at the radio system or any other digital communication channel.

Further preferably, said receiving data stream may correspond to a television program.

The object of the present invention is also solved by a device for reproducing data streams, wherein said device is adapted to perform the various embodiments of said method as described above.

The following explanation serves for a better understanding of the present invention, wherein an example of a radio system is described which is adapted to perform said method as described above. However, the invention is not limited to this example, and may be realized in various other ways. Said radio system may be based on a state of the art radio transmission chain, both analog or digital. In addition, an alternative audio source may be provided in order to fill gaps caused by skipping as well as filtering operations.

The alternative audio source could be realized by a double tuner concept provided with said radio system, where additional songs may be grabbed from alternative radio stations or organized in a priority list. On DAB systems another audio channel within the ensemble may be used for that purpose. Alternatively, on digital broadcast channels as DAB a provider may use a low bandwidth data channel as provided by the DAB packet mode to provide the alternative audio source. This channel does not necessarily require the full bandwidth of an audio channel and it could be even shared with other radio programs. The alternative audio source is more a file transfer issue and it is of course possible to use MOT (Multimedia Object Transfer) for that purpose. Finally, low end receivers may grab alternative songs from the regular program while the receiver is switched off by the user. In order to reduce the startup time between switching on the receiver and the availability of alternative audio segments, at least one alternative song may be stored permanently with a permanent storage media.

For the operation of said radio system it is required to know at least the start point of each audio segment, e.g the segmentation of the audio stream. This segmentation information may be obtained by a signal processor provided in a tuner of said radio system which is processing the incoming audio stream which corresponds to said receiving data stream as described above. Several common techniques used for pause detection, speech/music differentiation or beat rate detection could be applied in order to estimate the segmentation of the audio stream. Basically the volume and the spectrum of the signal may be analyzed over time for that purpose. Alternatively, the segmentation information may be provided from outside by an additional communication interface.

Regarding the playback of segments there are several restrictions depending on the content of a segment. Some segments may be skipped or filtered out, while for other segments the playback has to be guaranteed. Furthermore, there are segments which have to be presented immediately to the user without any delay, in which case the playback of other segments has to be interrupted. Most of the contents belong of course to the category which could be delayed as well as skipped or filtered by the receiver. As for example, the categories which may be skipped or filtered may include i.a. traffic performance, news, music, reports or sport events. On the other hand, the categories which have to be played immediately e.g. include traffic warning, traffic emergency or other emergency messages.

This characterization of the content is only useful when the content of the segments is known. If a radio station does not provide the content identification of the segments, everything (including advertisement spots) may be skipped, filtered and delayed beside all traffic messages. Traffic announcements are usually signalled by all radio stations and they have to be presented immediately to the user by interrupting the running playback.

In order to provide the full functionality of said radio system, e.g. four parameters for each fragment need to be signalled by a server or the radio station: start time, duration, category and, if applicable, the event location. While the start time is essential for the system to work, the other parameters enable additional features and functionalities.

Optionally it may be possible to signal context information for each song or report as the title name, interpret and so on as it is known from the RDS system. Furthermore, it is possible to assign labels to different sub-categories as reports, news or music. The radio system may then skip automatically single categories, e.g. the user will listen to the same radio program but without the hourly news.

The enhanced functionality may be given by two additional buttons which may be provided on a receiver device. The first one is the skip button which enables the user to skip the current song or report contained in the receiving data stream, e.g. news or songs the listener does not like. As described above, the first control signal is generated by pressing said skip button such that at least parts of the second data stream, e.g. containing a favourite song of the user, are included in said reproducing data stream instead of said receiving data stream for reproduction.

The second button is the recording button. This button allows the recording of a song or report to the permanent storage media during the time the song is played by the device. Since information are provided with respect to start and stop times of a given song or report, the permanent storage of the segment is exactly limited to the segment itself without any leading or trailing garbage.

If the user has an opportunity to skip the current segment, he will not change the station. This binds the listener to the station.

Optionally an indicator on, or near the buttons may indicate whether the current status of said radio system allows for the corresponding operation or not. If the device has enough temporary storage and allows for switching to different alternative segments, a list of available items may be shown on a display. The radio system may then have two buttons in order to scroll forward and backward through the list of available audio segments.

Beside skipping and recording of segments filtering may be applied to the audio stream on different levels. Traffic announcement could be switched on and off and the messages could be filtered by location. Furthermore, different content categories as news, reports and sports could be filtered out on request.

The resulting traffic handling system is very flexible and scales to a wide range of receivers. Receivers already in the field will keep the full service they have nowadays, while new receivers have the advantage of filtering and skipping messages and to turn on and off the traffic announcements.

The combination of spoken messages for warnings and a data channel for the performance will bind the traffic service again to the broadcast station. This enables the differentiation of service providers by the traffic service offered and generate a competitive situation among the broadcasters.

Even if filtering and skip functions are applied to the program it is still a live program and the listener will not recognize the operations done in the background by the receiver. In particular, there will be no gaps or interrupts between the newly arranged segments.

The accompanying drawings which are incorporated in and constitute a part of this specification illustrate an exemplary preferred embodiment of the invention, and in accordance with a general description of the invention given above, and the detailed description of the embodiment given below serves to explain the principle of the invention, wherein.

Figure 1:
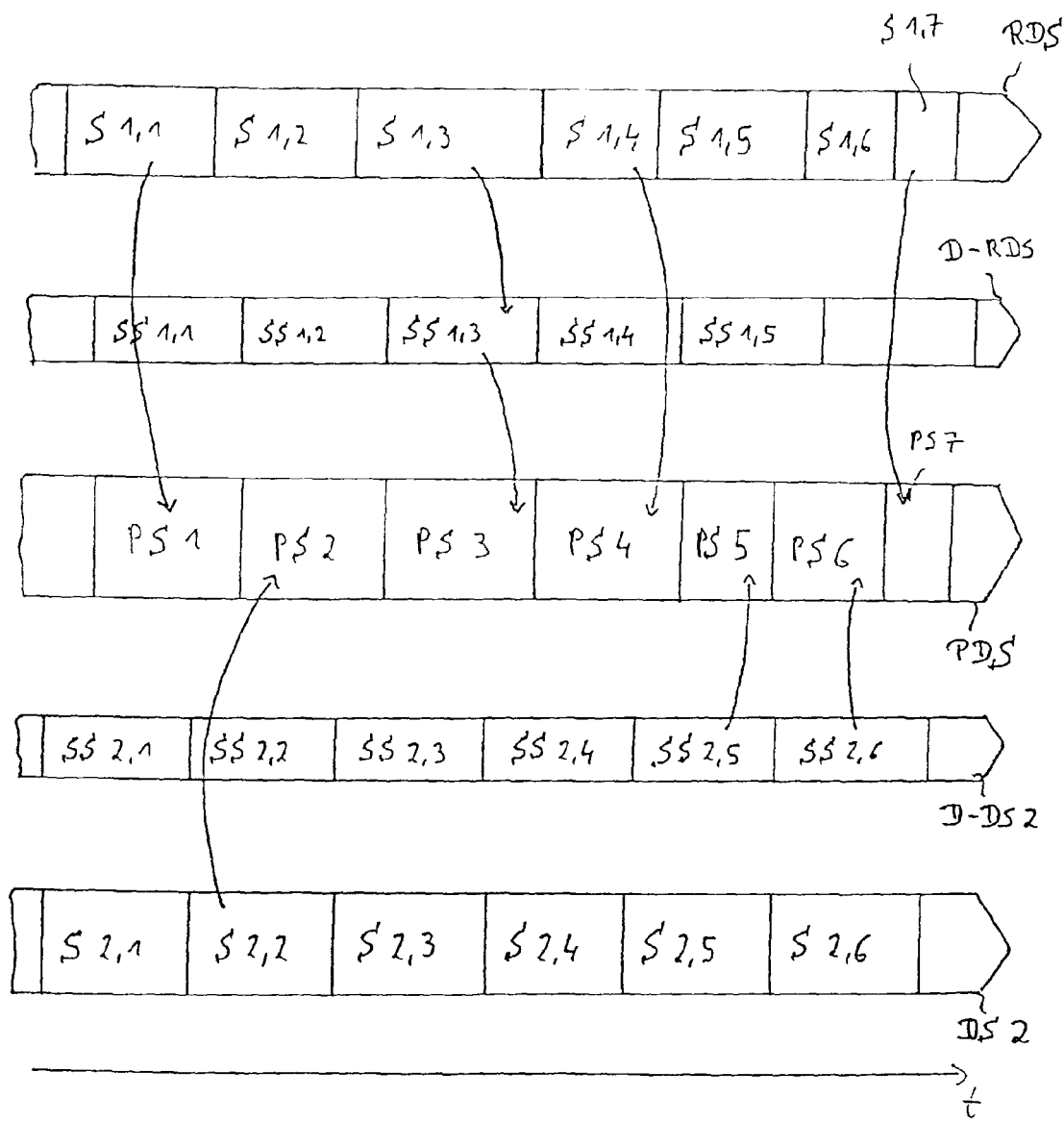
FIG. 1 illustrates the principle of providing a reproducing data stream within a method according to the present invention.

FIG. 1 schematically shows a plurality of data streams on which a method according to the present invention may be applied to. As depicted by a time arrow t shown at a bottom in FIG. 1, a course of time with respect to said data streams extends from left to right. Further, each of said data streams includes at least one segment belonging to a specific category.

In detail, a receiving data stream RDS is shown at the top of FIG. 1, in which various segments $S1,1$ to $S1,7$ are included. In the following description of said method, said receiving data stream RDS shall correspond to a live data stream of a broadcast radio program. Accordingly, the receiving data stream RDS is received by a radio system which is adapted to perform said method. However, the invention is not restricted to this example and may be carried out with any other kind of appropriate data stream.

The segment $S1,1$ of said receiving data stream RDS may be related to the category "music", wherein the other segments may be related to categories such as "news", "traffic announcements", "moderations" and the like.

Further, a second data stream DS2 is shown at the bottom of FIG. 1 having various segments $S2,1$ to $S2,6$. By way of example, said second data stream DS2 is stored in an instant memory means. The user has the possibility to organize said second data stream DS2 such that its segments $S2,1$ to $S2,6$ are related to categories which match the preferences of the user. In other words, said segments $S2,1$ to $S2,6$ may include preferred music pieces of a favourite composer or artist.

Still further, a reproducing data stream PDS is illustrated having various segments PS1 to PS6. The area between the receiving data stream PDS and the reproduction data stream PDS is associated with a temporary storage means, in which a derivative of said receiving data stream RDS may be generated. In accordance with the segments $S1,1$ to $S1,6$ included in said receiving data stream RDS, a derivative data stream D-RDS of said receiving data stream RDS contains segments $SS1,1$ to $SS1,6$. Similarly, the area between the reproduction data stream PDS and the second data stream DS2 is associated with another temporary storage means in which a derivative D-DS2 of said second data stream DS2 may be generated.

The reproducing data stream PDS is reproduced in that the segment PS2 is reproduced subsequent to the segment PS1, the segment PS3 is reproduced subsequent to the segment PS 2 etc. With reference to the course of time indicated by said arrow t, the segments of said reproducing data stream follow one after the other such that a continuous and unbroken reproduction of said reproducing data stream PDS is achieved.

After said radio system has received said receiving data stream RDS. the segment S1,1 of said receiving data stream RDS is processed such that the contents thereof is included into said reproduction data stream PDS and reproduced as the segment PS1 of said reproducing data stream. PDS. As for example, the segment S1,1 belongs to the category music such that a user listens to music contained in the segment S1,1 while the segment PS1 is reproduced accordingly.

Segmentation data or category data are either provided by the radio station broadcasting said receiving data stream RDS or generated by means of an external independent server containing a signal processor for the extraction of the respective segmentation information. As for result, the end of a preceding segment and the beginning of a succeeding segment of said receiving data stream RDS and/or of said second data stream DS2 can be detected.

The radio system is provided with input means (not shown) by which the user can define an individual default for skipping segments of said receiving data stream RDS in which he is not interested in. For example, the segment S1,2 of said receiving data stream RDS belongs to the category "hourly news" to which the user does not want to listen to. Following the individual default defined by the user, a segment S2,2 of the second data stream DS2, which contains e.g. a piece of music of the user's favourite composer, is included as the segment PS2 into said reproducing data stream PDS and thereby reproduced instead of said segment S1,2 in response to a first control signal. Said first control signal is generated from and/or in accordance to reproduction control data RCD which are provided for controlling the selection and/or the reproduction of said reproducing data stream PDS. In the above example, the first control signal is generated such that the segment S1,2 is skipped and that the segment S2,2 is included into said reproducing data stream PDS instead of said segment S1,2. As for result, the user listens to the piece of music of his favourite composer instead of listening to the hourly news.

In addition, it is possible to provide a rewind and forward function to be applied to a segment of said second data stream DS2 and/or of a derivative D-DS2 thereof. In the above example, the user may rewind the piece of music he has actually listened to such that he listens to said piece of music or to parts thereof again. Alternatively, the user may avoid listening to a piece of music or parts thereof which he actually does not like by means of performing said forward function.

As depicted by additional data streams D-RDS and D-DS2 in FIG. 1, respectively, derivatives of said receiving data stream RDS and of said second data stream DS2 may be generated, respectively, such that correponding copies thereof are stored e.g. in temporary storage means. In the above example, while the segment S2,2 is included into said reproducing data stream PDS and reproduced as the segment PS2, a derivative SS1,3 of the segment S1,3 of the receiving data stream RDS is generated such that a copy of the segment S1,3 is stored in a corresponding temporary storage means. In coincidence with the termination of said piece of music of the user's favourite composer, i.e. in coincidence with the end of the segment PS2 of the reproducing data stream PDS, said derivative SS1,3 of the segment S1,3 is reproduced with said reproducing data stream PDS. The beginning of said derivative SS1,3 is coincident with the end of the segment PS2 such that the reproducing data stream is not inadvertently interrupted. The purpose of this measure is that on the one hand, the user should have the possibility to skip certain segments of the life program corresponding to the receiving data stream RDS which he does not like, but on the other hand the user should not notice that the program has been manipulated. Consequently, while a part of the second data stream DS2 is included into said reproducing data stream PDS instead of a certain segment of said receiving data stream RDS for reproduction, derivatives of the subsequent segments of the receiving data stream RDS are generated such that no information probably important for the user gets lost and such that a corresponding derivative of a segment of said receiving data stream RDS may by concatinated to a preceding segment of the reproducing data stream PDS.

During the reproduction of a derivative of the receiving data stream, the reproduction speed thereof can be slightly increased without notice of an audio-distortion such that a time delay between the derivative of the data stream D-RDS and its corresponding segment of the receiving data stream RDS itself can be caught up. In the above example, the derivative SS1,3 can be reproduced as the segment PS3 of said reproducing data stream PDS slightly faster than normal reproduction speed such that the end of said segment PS3 becomes coincident with the beginning of the subsequent segment S1,4 of the receiving data stream RDS. Hence, in the subsequent course of time, the segment S1,4 itself of the receiving data stream RDS, and not a derivative thereof, is included into said reproducing data stream PDS as the segment PS4 such that the user is listening again to the "real life program" without any time delay.

With reference to the segments SS2,5 and SS2,6 of said data stream D-DS2, it is to be understood that derivatives may also be generated from segments of the second data stream DS2. In case that the segments S1,5 and S1,6 of the receiving data stream RDS belong to categories of which the user is not interested in, the corresponding derivatives SS2,5 and SS2,6 are included into the reproducing data stream PDS instead of the segments S1,5 and S1,6 and are reproduced as segments PS5 and PS6, respectively. Similar to the above explication referred to the segment S2,2, the segments SS2,5 and SS2,6 may also belong to a category containing e.g. a piece of music which the user prefers listening to.

The above explication has been made on the assumption that categories of the segments of the receiving data stream RDS on the one hand and the second data stream on the other hand have the same level of priority, wherein the selection of a specific segment is organized according to the reproduction control data and the user's individual default, respectively. However, e.g. in the field of traffic announcements, there may occur important traffic warnings having higher priority than e.g. a favourite piece of music contained in the second data stream DS2 which is temporarily included into said reproduction data stream PDS. As for example, a segment S1,7 of the receiving data stream belongs to said category of traffic warnings. Because this category has a higher pirority then the piece of music contained in the derivative SS2,6 being included in the segment PS6 of the reproduction data stream PDS, the reproduction of said derivative SS2,6 is interrupted immediately such that the segment S1,7, i.e. said important traffic warning, can be immediately and essentially instantaneously reproduced with said reproducing data stream PDS. By this means, the security of the user, e.g. while driving a car, is enhanced.

The following description serves to illustrate further effects of the present invention which are helpful for the user during performing said method. As soon as a full song from the second data stream DS2 is available, the user may skip the current song or report on the receiving data stream RDS and switch to a song included in said second data stream DS2.

Switching can be done even before the full song is available. The condition is, that the song must be fully available at the time which is given by the end of the playback. When the playback of the alternative song has finished, said method returns to the receiving data stream RDS. In order to avoid an interruption at that time, said method does not enter the receiving data stream RDS itself, but a derivative of said receiving data stream RDS. Therefore, it is possible to start at the beginning of a song or report which is delayed by buffering. The user therefore will only recognize the switch to the alternative song, which is done on his own request, but not the return switch back to the receiving data stream RDS. This results in a continuous operation where the user does not lose synchronization to the live program corresponding to said receiving data stream RDS, which is just delayed by a short time period after a skip operation was performed.

The reproduction of said derivative of said receiving data stream RDS may be interrupted in the same way as the reproduction of the receiving data stream RDS itself. On user's request, said method switches again to the instant memory means in which said second data stream DS2 is stored. From said instant memory means, said method may also switch back to the receiving data stream RDS on user's request. From the user's point of view this is just another skip operation which is available immediately after switching to the alternative song. The user will in general not recognize that there is a background channel. For the user it is always just a skip of the current song and the program is continued after that without any interrupt or discontinuity.

If said radio system has enough storage capacity to store many songs, the user may switch to the next song either by random or by selecting songs from a list. In that case the device may have two buttons in order to scroll through the list of available songs.

Figure 2:
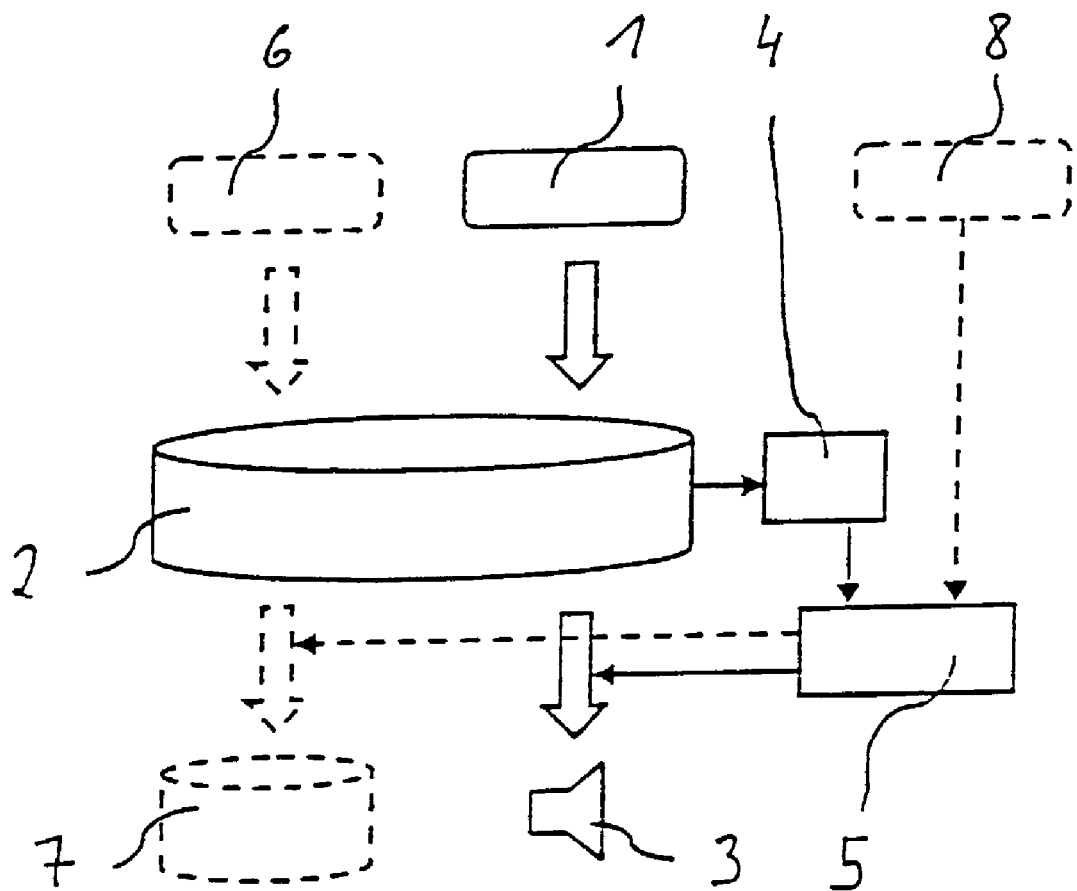
FIG. 2 illustrates a principle configuration of a receiver which is adapted to perform an embodiment of the method according to the present invention.

An embodiment of said radio system adapted to perform said method is explained with reference to FIG. 2. Said radio system comprises a tuner 1 with digital output, a temporary storage means 2 to store the digital output of the tuner 1 and an output unit 3 which is able to handle the digital audio signal generated from the storage means 2, which corresponds to said reproducing data stream as explained above. Furthermore, said radio system comprises a first signal processor 4 for the segmentation of the audio signal in segments, as well as a controller 5 which controls the playback of the audio segments based on the segmentation information from the signal processor 4. Optionally, the receiver may have a second tuner 6 for receiving the alternative audio source. Another option is the integration of a permanent storage means 7 which enables the permanent recording of audio segments by simply pushing a button during playback. Said radio system may optionally have an additional communication port 8 for receiving the segmentation information of said receiving data stream RDS stream as well as some additional context information on the segments from outside. On DAB systems this may be the PAD (Program Associated Data) channel, on FM systems RDS (Radio Data System) may be used for that purpose. Alternatively, this could be an IP connection using the Internet or any other network connection which might be available with said radio system or any other digital communication channel.

Figure 3:
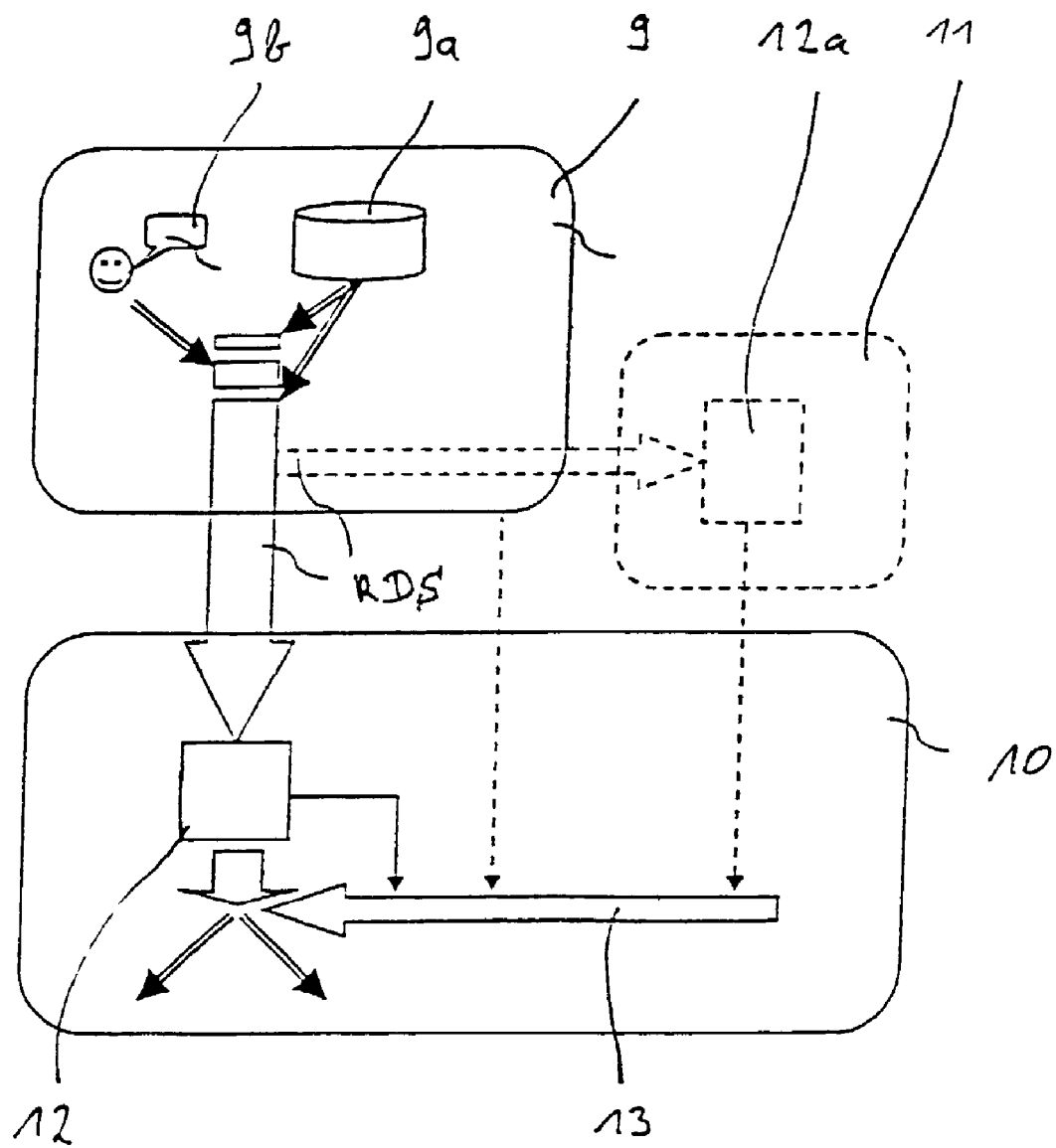
FIG. 3 illustrates a principle data flow while performing another embodiment of the method according to the present invention.

The overall data flow while performing said method is shown in FIG. 3. It contains three blocks: A radio station 9, a radio system 10 and an optional independent external server 11. In the radio station 10 the audio stream corresponding to said receiving data stream RDS is composed by combining audio segments as reports and songs from an audio database 9a with spoken announcements 9b from a moderator. The radio system 10 contains a second signal processor 12 which extracts the segmentation information from the audio stream received as the receiving data strea RDS and provides this information to an audio splitter 13 which extracts the original segments from the audio stream.

The extraction of the segmentation structure is regarded as not perfect, it is just a best effort information which is not guaranteed to work in any case. Therefore two options to enhance this basic setup are proposed. With the first option the segmentation structure is provided directly by the radio station 9. This is the preferred option, because the segmentation information is directly available at the radio station 9 and will therefore exactly match the broadcast stream. Radio stations could offer a better service as well as enabling new business by billing their customers for providing an advertisement free program. In order to motivate radio stations to provide their segmentation information, the radio system 10 could block skipping and filtering of advertising spots for stations providing those information.

The second option incorporates the external independent server 11 which contains also a third signal processor 12a for the extraction of the segmentation information. Since this could be a central server serving all receiver clients, it would be possible to use much more computational resources than in the receiver to obtain a better segmentation.

Figure 4:
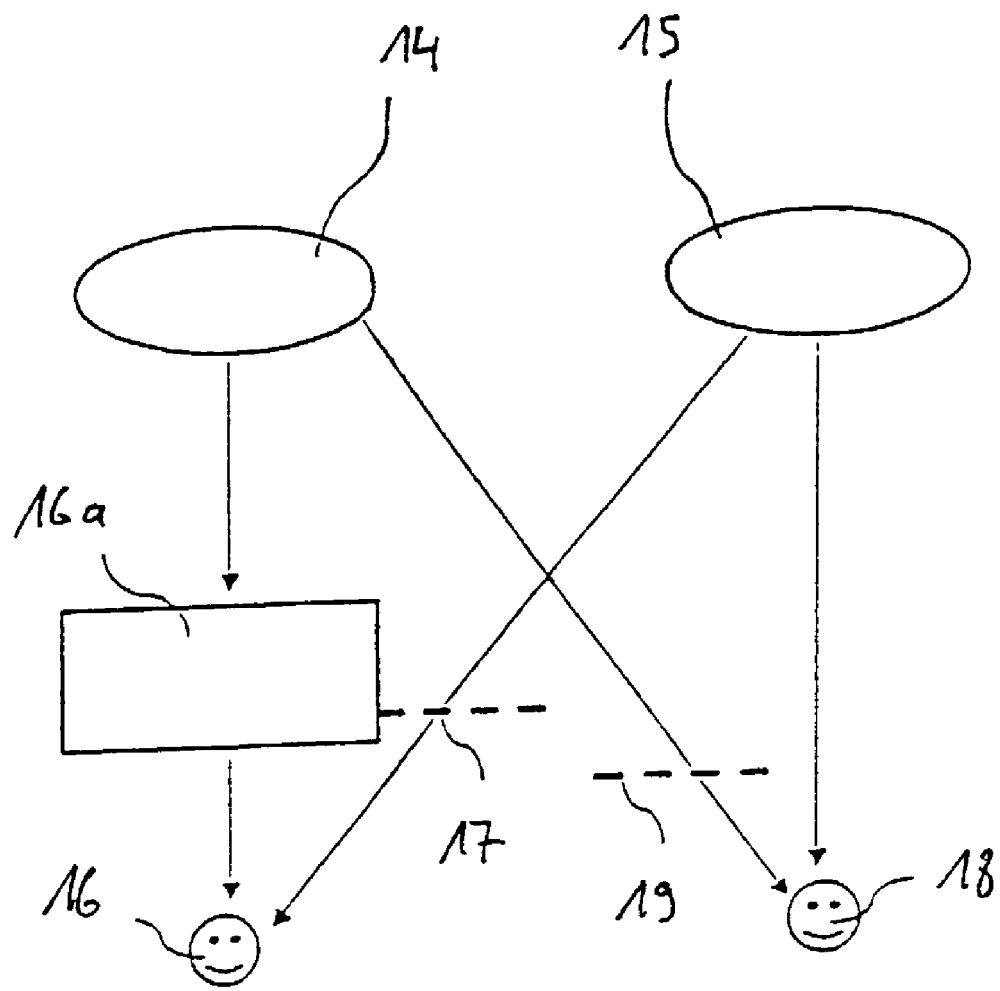
FIG. 4 illustrates another embodiment of the method according to the present invention.

FIG. 4 shows the advanced handling options of different kind of traffic messages which may be performed with said method. In general, traffic-related announcements may be divided in two categories: performance-related messages 14, which are purely related to travel time, and warning messages 15, which are used to inform the driver about potentially dangerous events and therefore directly addresses drivers security. Depending on the capabilities of the radio system 10, these messages may be handled differently. A first user 16 of a navigation system 16a will not listen to any performance-related message, since the navigation system is responsible for selecting the fastest route even in the presence of traffic congestions. The navigation system 16a will receive traffic-related data from a machine readable data channel as RDS-TMC. From the navigation system 16a the first user 16 will get only driving directions.

However, the first user 16 is still interested in the verbal announcement of warning messages 15. A warning message 15 presented by verbal announcement 9b (see FIG. 3) via broadcast is much more flexible than warning messages coded in a data service as RDS-TMC. In order to further optimize (reduce) the number of spoken messages, warning messages could be filtered out by means of a first filter 17 based on the current location of the receiver provided by the navigation system 16a. As a result, the first user 16 of said high end navigation system will only listen to security-related traffic messages around his current position.

For a second user 18 of a standard receiver all warning messages will be provided, since the position of the receiver is unknown. But there is an option to filter the performance messages based on the type or the configuration of said radio system by means of a second filter 19. A car receiver will present the performance message, while a home receiver will not. This default setting could be overwritten by the user, e.g. a traffic announcement on/off button on the device (not shown).

The resulting traffic handling system is very flexible and scales to a wide range of receivers. Receivers already in the field will keep the full service they have nowadays, while new receivers have the advantage of filtering and skipping messages and to turn on and off the traffic announcements.

The combination of spoken messages for warnings and a data channel for the performance will bind the traffic service again to the broadcast station. This enables the differentiation of service providers by the traffic service offered and generate a competitive situation among the broadcasters.

Even if filtering and skip functions are applied to the program it is still a live program and the listener will not recognize the operations done in the background by the receiver. In particular, there will be no gaps or interrupts between the newly arranged segments.

The main advantages of the present invention are based on the following:

- Users are able to skip songs or reports without losing synchronization to the radio station. The live program is continued after skipping without any interrupt;
- Stations can provide a better service and can avoid losing listeners by this technology. The listener will not change the station if they have an escape opportunity within the channel;
- The user can switch on and off performance-related traffic announcements;
- Traffic announcements could be filtered by location;
- The user may filter the program by category;
- The traffic services is bound to the station, since the whole traffic concept includes verbal announcements; and
- Very flexible traffic system: Old receivers could be used without limitations, new receivers have enhanced functionality.

The invention claimed is:

1. A method for reproducing data streams, comprising:
   receiving, at a device for reproducing data streams, a receiving data stream of an audio or video program, the receiving data stream including a sequence of segments;
   providing a second data stream to the device for reproducing data streams, the second data stream corresponding to another audio or video program which is different than the audio or video program of said receiving data stream;
   generating a derivative of said receiving data stream;
   generating, at the device for reproducing data streams, the reproducing data stream on the basis of said sequence of segments
   by replacing, in response to a first control signal, at least one of said segments of the receiving data stream by a further segment of the second data stream, and
   by replacing at least one certain segment of the receiving data stream, which follows the segment of the receiving data stream that is replaced with the further segment of the second data stream, with the derivative of said certain segment, such that an end of said derivative becomes approximately temporally coincident with a beginning of a subsequent segment of said receiving data stream, wherein a reproduction speed of the derivative of said certain segment is higher or lower than a regular reproduction speed of said certain segment when an ending time of the further segment of the second data stream does not coincide with a beginning time of the certain segment in the receiving data stream; and
   playing, at the device for reproducing data streams, said reproducing data stream.

2. The method according to claim 1, wherein said derivative is played with said reproducing data stream in response to a second control signal.

3. The method according to claim 2, wherein said second control signal is generated at the termination of reproducing one part and/or segment of said second data stream and/or a reproduction of said second data stream with said reproducing data stream.

4. The method according to claim 1, further comprising the steps of:
   providing segmentation data and/or category data at least for said receiving data stream;
   selecting at least parts and/or segments of said receiving data stream as parts and/or segments of said reproducing data stream in accordance to said segmentation data and/or to said category data.

5. The method according to claim 4, wherein said segmentation data and/or said category data are generated from and/or received with said receiving data stream.

6. The method according to claim 4,
   wherein categories of segments included in said receiving data stream are evaluated according to different priority levels; and
   wherein upon receipt of a segment of said receiving data stream and/or of said second data stream which belongs to a certain category said segment or a derivative thereof is unconditionally included into said reproducing data stream for immediate and essentially instantaneous reproduction.

7. The method according to claim 6, wherein said certain category of said segment which is included into said reproducing data stream for immediate and essentially instantaneous reproduction is of a higher priority than a category of a part and/or segment of said reproducing data stream or derivatives thereof, or than a category of a part and/or segment of said second data stream or derivatives thereof, being reproduced whilst receiving said segment belonging to said certain category.

8. The method according to claim 6, wherein said receipt of said segment of said receiving data stream is dependent on a temporal attribute of the device for reproducing data streams.

9. The method according to claim 1, wherein parts and/or segments of said second data stream are selected from an instant data stream, in particular from an instant memory means.

10. The method according to claim 1, wherein live data streams and/or broadcast data streams are used as said receiving data stream.

11. The method according to claim 10, wherein said reproducing data stream is generated and/or played such that distinct parts or segments stemming from live data streams and/or broadcast data streams are reproduced with a minimum time delay essentially in temporal coincidence with the respective part or segment of said receiving data stream.

12. The method according to claim 1, wherein reproduction control data are provided for controlling selection and/or reproduction of said reproducing data stream.

13. The method according to claim 12, wherein said first control signal is generated from and/or in accordance to said reproduction control data.

14. The method according to claim 1, wherein said first control signal is generated upon request.

15. The method according to claim 14, wherein at least parts of said second data stream and/or of derivatives thereof are selected from a list.

16. The method according to claim 1, wherein said reproducing data stream is built up for a continuous and/or unbroken reproduction of said receiving data stream or of derivatives thereof and/or of said second data stream or of derivatives thereof in particular by essentially sequentially concatenating selected parts or segments or derivatives thereof with fitting beginnings and ends, in particular in a smooth way.

17. The method according to claim 1, wherein generating of a respective derivative corresponds to a storing, a recording and/or a buffering thereof.

18. The method according to claim 1, wherein a part and/or segment of said reproducing data stream is recorded upon request while playing said respective part and/or segment.

19. The method according to claim 1, wherein said receiving data stream is based on analog and/or digital signals.

20. The method according to claim 1, wherein said receiving data stream corresponds to a radio program or a television program.

21. The method according to claim 1, further comprising:
generating a derivative of said second data stream, wherein a reproduction speed of individual segments of said derivative is higher or lower than a regular reproduction speed of said individual segments,
wherein generating the reproducing data stream further comprises, replacing a further segment of the second data stream with a derivative of the further segment such that an end of the derivative becomes approximately temporally coincident with a beginning of a subsequent segment of the receiving data stream.

22. A device for reproducing data streams, comprising:
a receiving unit configured to receive a receiving data stream of an audio or video program, the receiving data stream including a sequence of segments;
a processing unit configure to generate a derivative of said receiving data stream, and to generate a reproducing data stream on the basis of said sequence of segments of said receiving data stream by replacing, in response to a first control signal, at least one of said segments by a further segment of a second data stream, said second data stream corresponding to another audio or video program which is different than the audio or video program of said receiving data stream, and by replacing at least one certain segment of the receiving data stream, which follows the segment of the receiving data stream that is replaced with the further segment of the second data stream, with a derivative of said certain segment, such that an end of said derivative becomes approximately temporally coincident with a beginning of a subsequent segment of said receiving data stream, wherein a reproduction speed of the derivative of said certain segment is higher or lower than a regular reproduction speed of said certain segment when an ending of the further segment of the second data stream does not coincide with a beginning time of the certain segment in the receiving data stream; and
a reproducing unit configured to reproduce said reproducing data stream.

23. A method for reproducing data streams, comprising:
receiving, at a device for reproducing data streams, a receiving data stream of an audio or video program, the receiving data stream including a sequence of segments;
providing a second data stream to the device for reproducing data streams, said second data stream corresponding to another audio or video program which is different than the audio or video program of said receiving data stream;
generating a derivative of said second data stream;
generating, at the device for reproducing data streams, a reproducing data stream on the basis of said sequence of segments
by replacing, in response to a first control signal, at least one of said segments of the receiving data stream by a further segment of said second data stream, and
by replacing the further segment of the second data stream with the derivative of the further segment, such that an end of the derivative becomes approximately temporally coincident with a beginning of a subsequent segment of the receiving data stream, wherein a reproduction speed of the derivative of said further segment is higher or lower than a regular reproduction speed of said further segment when an ending time of the further segment of the second data stream does not coincide with a beginning time of the subsequent segment in the receiving data stream; and
playing, at the device for reproducing data streams, the reproducing data stream.

24. The method according to claim 23,
wherein categories of segments included in the receiving data stream are evaluated according to different priority levels; and
wherein upon receipt of a segment of the receiving data stream and/or of the second data stream which belongs to a certain category, the segment or a derivative thereof is unconditionally included into the reproducing data stream for immediate and approximately instantaneous reproduction.

25. The method according to claim 24,
wherein the category of the segment which is included into the reproducing data stream for immediate and approximately instantaneous reproduction is of higher priority than a category of a part and/or segment of the reproducing data stream or derivatives thereof, or than a category of a part and/or segment of the second data stream or derivatives thereof, being played while receiving the segment belonging to the certain category.

26. The method according to claim 23, further comprising:
generating a derivative of said receiving data stream, wherein a reproduction speed of individual segments of said derivative is higher or lower than a regular reproduction speed of said individual segments,
wherein generating the reproducing data stream further comprises replacing a certain segment of the receiving data stream with a derivative of the certain segment such that an end of the derivative becomes approximately temporally coincident with a beginning of a subsequent segment of the receiving data stream.

* * * * *